W. B. S. Taylor.
Making Flexible Tubing.
No. 55,740. Fig. 1. Patented Jan. 19, 1866.
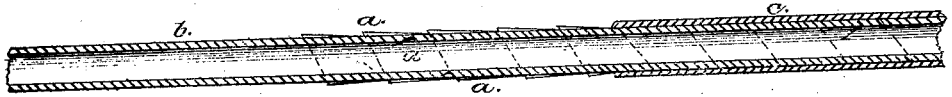
Fig. 2.
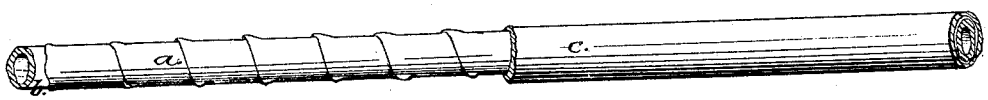
Fig. 3.
Fig. 4.
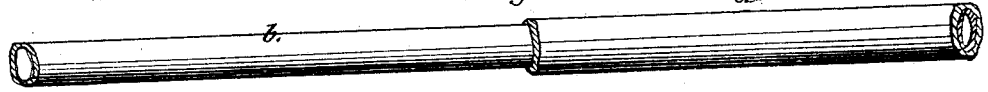
Witnesses:
F. C. Treadwell Jr.
John A Duncan
Inventor:
W. B. S. Taylor

UNITED STATES PATENT OFFICE.

WM. B. S. TAYLOR, OF NEW YORK, N. Y.

IMPROVEMENT IN THE MANUFACTURE OF FLEXIBLE TUBING.

Specification forming part of Letters Patent No. 55,740, dated June 19, 1866.

*To all whom it may concern:*

Be it known that I, WILLIAM B. S. TAYLOR, of the city and county of New York, and State of New York, have invented a certain new and useful Improvement in the Manufacture of Flexible Tubing for Illuminating-Gas and Similar Purposes; and I do hereby declare that the following is a full and correct description thereof, reference being had to the annexed drawings, and to the letters of reference thereon.

The nature of my said invention consists in making flexible gas-tight tubing by combining in a flexible tube a layer or layers of animal membrane coated or covered with glue or other gelatinous cement, substantially as hereinafter described.

In the manufacture of my improved tubing I use animal membrane, which composes the guts, stomach, bladder, and other animal intestines, and having cleaned and cut them into strips, soften the strips with glycerine or molasses, so as to make them perfectly pliable. They are then ready to be combined with suitable flexible material for flexible tubing.

The object of the use of animal membrane and glue is to resist the penetrative action of the gas and its fluids. The membrane is disposed in the tube in either a double or single helical layer, overlapping at the joints. I prefer to use a double layer. It may be placed in this form in a flexible tube, so as to form the inner layer or lining thereof, or it may constitute the covering of a flexible tube, also the inlayer between two layers of other flexible material, the whole constituting a flexible tube.

In applying the membrane to the manufacture of the tubing, besides winding the strips in a helical form, so as to overlap at the edges or joints, I also shir or plait it to give it capacity for bending freely with the tube; but the mode of making the tubing will be better understood by referring to the drawings, which illustrate my invention.

Figures 1 and 2 are views of a tube in which the membrane $a$ is wound and shirred on a tube of india-rubber, $b$, the rubber tube being stretched about one-eighth of its length while the membrane is being wound on it. The shirring is shown exaggerated in Fig. 2. It is a sort of wrinkling of the skin or membrane that is produced by this operation. The membrane is then coated with a solution of glue or other suitable flexible gelatinous cement, and a covering of sheet-rubber or other suitable flexible material, $c$, applied. If the flexible material of the covering be not elastic it may be also shirred onto the tube.

I prefer the form of tubing shown in Figs. 1 and 2, but it may be made, as shown in Figs. 3 and 4, by winding the layers of membrane on a mandrel and removing the mandrel after the membrane is cemented to the outer covering, $b$. The mandrel may be elastic—as, for instance, a tube or round strip of rubber. In that case the shirring of the membrane is produced by stretching the elastic mandrel used as a former, and it is readily removed, when the tube is completed, by further stretching it so as to decrease its diameter.

The membrane may be applied to flexible material that is not elastic by plaiting or gathering it as it is wound on; but I prefer to use elastic material as a foundation for the tubing and also to protect the membrane from abrasion.

If desired, the tubing may have an extra covering, as shown at $d$, Figs. 3 and 4.

I claim as my invention and improvement in flexible tubing for illuminating-gas—

The combination, in a flexible gas-tube, of a layer or layers of animal membrane coated with glue or other suitable gelatinous cement, substantially as described, and for the purpose of resisting the penetrative action of the gas and its fluids.

W. B. S. TAYLOR.

Witnesses:
 F. C. TREADWELL, Jr.,
 JOHN A. DUNCAN.